United States Patent Office 2,973,332
Patented Feb. 28, 1961

2,973,332

PRODUCTION OF UNSATURATED POLYESTER RESINS AND OF COPOLYMERS THEREFROM

Hans Fikentscher, Hans Wilhelm, and Herbert Willersinn, Ludwigshafen (Rhine), Germany, assignors to Badische Anilin- & Soda-Fabrik Aktiengesellschaft, Ludwigshafen (Rhine), Germany No Drawing. Filed Dec. 18, 1956, Ser. No. 628,993

Claims priority, application Germany Dec. 21, 1955

15 Claims. (Cl. 260—26)

This invention relates to the production of unsaturated polyester resins and of copolymers therefrom.

Unsaturated polyester resins are in general obtained by polycondensation of alpha,beta-unsaturated polycarboxylic acids with polyfunctional alcohols. The unsaturated polycarboxylic acids may be partly replaced by saturated polycarboxylic acids. Unsaturated polyesters of the said kind are highly viscous oils to solid resinous masses. Many are so solid at room temperature that they can be granulated or powdered. These powders and granulates have the drawback, however, that the individual particles, even after a short time, adhere to each other and form a compact mass which is difficult to work up and dissolve. The coatings prepared therewith are also not always satisfactory.

We have now found that unsaturated polyester resins which yield excellent lacquer resins and which do not stick together are obtained from alpha.beta-unsaturated polycarboxylic acids and polyhydric alcohols by co-employing in their preparation at least 30 percent of colophony, abietic acid or their reaction products with dienophilic compounds, with reference to the total weight of the initial materials. We have also found that copolymers with excellent properties are obtained by polymerizing mixtures of such unsaturated polyester resins and ethylenically-unsaturated monomeric compounds.

As the alpha.beta-unsaturated polycarboxylic acids there may be used all which are used for the production of unsaturated polyester resins, especially alpha.beta-unsaturated dicarboxylic acids, as for example maleic acid, fumaric acid, itaconic acid, aconitic acid, citraconic acid, or their substitution products, as for example monochlormaleic acid or dichlormaleic acid, and also their anhydrides or esters with low molecular weight alcohols.

Similarly all known dihydric and polyhydric alcohols may be used, for example especially saturated (but also unsaturated) aliphatic or aliphatic-aromatic, straight-chain or branched polyalcohols, such as ethylene glycol, propane-diol-1.2, propane-diol-1.3, butane-diol-1.3, butane-diol-1.4, pentane-diol-1.5, 2,2-dimethylpropane-diol-1.3 or hexane-diol-1.6, and also diethylene glycol, triethylene glycol, tetra-ethylene glycol, butene-diol-1.4, butene-diol-1.2, glycerine, butane-triol, trimethylol-propane, pentaerythritol, terephthalic alcohol and also, for example, halogen-containing substitution products thereof. The polyfunctional alcohol may be partly replaced by one or more aminoalcohols, as for example ethanolamine.

In addition to the said compounds there are used, in the production of the unsaturated polyester resins, at least 30 percent and a maximum of about 85 percent, preferably about 35 percent to 70 percent, with reference to the total weight of the initial materials for the production of the unsaturated polyester resins, of colophony, abietic acid or their reaction products with dienophilic compounds, especially Diels-Alder adducts of colophony or abietic acid and dienophilic unsaturated mono- or poly-carboxylic acids, preferably alpha.beta-unsaturated mono- or poly-carboxylic acids or their anhydrides, as for example acrylic acid, maleic acid, maleic anhydride, or their substitution products, such as chloracrylic acid or dichlormaleic acid. Addition compounds of maleic anhydride to abietic acid and dextropimaric acid are described for example by L. Ruzicka, P. J. Ankersmit and B. Frank, Helv. Chim. Acta 15 (1932) 1289. It is also possible to use diene adducts of colophony or abietic acid with dienophilic components in which part of the carboxylic groups is not present in free form, for example their partial esters, partial amides or partial nitriles and the like, as well as reaction products of dienophilic unsaturated mono- or polycarboxylic acids with colophony or abietic acid which contain no carboxylic groups, in so far as these can be obtained in the diene adducts in a simple way, for example by later saponification, in a free form or are accessible during the polycondensation reaction to a re-esterification or alcoholysis. Among these may be mentioned for example the diene adducts of maleic acid diesters or acrylic acid esters to colophony.

When colophony or abietic acid is used, the alpha.beta-unsaturated polycarboxylic acid must be used in such amounts—in order to obtain an unsaturated polyester resin—that it cannot be completely used up by the Diels-Alder reaction. For example the colophony can be heated with a molar excess of maleic acid, its anhydride or another unsaturated polycarboxylic acid, until the colophony has completely reacted with the unsaturated acid, and then one or more dihydric or polyhyric alcohols, if desired in admixture with one or more mono-alcohols, can be added in such an amount that after the polycondensation there are formed unsaturated polyester resins having the desired degree of condensation.

When using colophony or abietic acid, however, it is not essential to carry out the formation of the diene adduct separately from the formation of the polyester resin. The adduct formation may also be allowed to proceed simultaneously with the esterification. For example colophony and an excess—with respect to the colophony—of an alpha-beta-unsaturated polycarboxylic acid can be heated together with the necessary alcoholic components, so that formation of the diene adduct and polyesterification proceed side by side and valuable unsaturated polyester resins are obtained.

The unsaturated polycarboxylic acids used for the production of the polyester resins can be partly replaced, for example to the extent of about 20 to 80 percent and preferably about 30 to 70 percent, by saturated polycarboxylic acids. Among these there may be mentioned aliphatic, preferably saturated aliphatic, cycloaliphatic, aromatic or aliphatic-aromatic polycarboxylic acids and in particular dicarboxylic acids, as for example phthalic acid, terephthalic acid, phenylene dibutyric acid, succinic acid, glutaric acid, alpha-methyl-glutaric acid, adipic acid, oxadibutyric acid or sulfonic-dibutyric acid or their substitution products, such as tetrachlorphthalic acid or the anhydrides of the said acids. It is also possible to replace part of the carboxylic acids and of the alcohols by saturated or unsaturated hydroxyacids.

Obviously mixtures of the said components may also be used for the production of the polyester resins. Thus for example by condensation of a mixture of abietic acid, a diene adduct from colophony and acrylic acid, maleic acid and itaconic acid and also phthalic acid and succinic acid together with a mixture of different glycols in stoichiometrical proportions, unsaturated polyester resins with excellent properties are obtained.

Although it is especially advantageous to use the acid and alcoholic components in stoichiometrical proportions so that there is an alcoholic hydroxyl group for each carboxylic group, it is also favorable in many cases, especially when using a volatile component, to use the latter in excess, for example an excess of up to 15 percent or more.

Instead of the free acids there may also be used their esters with lower alcohols. In this case the polycondensation proceeds by way of a re-esterification.

The polycondensation is preferably carried out in a melt at about 140° to 250° C., preferably at 160° to 220° C., and preferably while excluding atmospheric oxygen, in the presence of an indifferent gas, for example nitrogen. It is preferable to lead the nitrogen through or over the melt. Towards the end of the polycondensation it is often advantageous to add a polymerization inhibitor, for example hydroquinone. In many cases it is recommendable, after a precondensation, to carry out the main reaction, especially towards the end, in vacuo. Esterification catalysts, such as para-toluenesulfonic acid, or small amounts of sulfuric acid may be added, but this is not necessary. If the polycondensation proceeds by way of a re-esterification, however, it is favorable to add to the reaction mixture a re-esterification catalyst, such as para-toluenesulfonic acid, or alkali metal alcoholates, as for example sodium methylate or ethylate. The condensation is continued until the acid number of the polyester resin formed has fallen to the desired value, preferably below 50. It is also possible to condense in the presence of a solvent, for example trichlorethylene, benzene or toluene, and continuously to distil this off azeotropically with the water formed during the condensation. The solvent freed from water can be returned to the reaction vessel. When the reaction is completed, the solvent is preferably distilled off in vacuo.

By the co-employment of monofunctional, preferably saturated, caboxylic acids or alcohols in the polycondensation, it is possible to vary the degree of condensation of the unsaturated polyester resins. It is especially advantageous to add monofunctional carboxylic acids or alcohols when trihydric or polyhydric alcohols or acids are used at the same time. In this way cross-linking can be prevented. Thus it is favorable, when using tricarboxylic acids, for example an adduct of maleic acid to colophony or abietic acid, to condense in such amounts of a monofunctional alcohol into the unsaturated polyester that for each mol of the tricarboxylic acid there are about 0.8 to 1.3 mols of the monoalcohol.

The unsaturated polyester resins modified with colophony or abietic acid can furthermore be prepared by boiling a known unsaturated polyester resin, for example from maleic acid, phthalic acid, and glycol, with a polyester resin which has been prepared from reaction products of colophony or abietic acid with dienophilic compounds and dihydric or polyhydric alcohols. The boiling, i.e. the re-esterification reaction, is carried out at about 150° to 300° C., preferably in the presence of a re-esterification catalyst and an inhibitor and preferably under an indifferent gas. Suitable inhibitors are for example polyhydric phenols, as for example quinones or also hydroquinone, pyrocatechol or tertiary-butyl paracresol. It is advantageous to react about 10 to 90 parts and especially 40 to 60 parts of a known unsaturated polyester resin with 90 to 10 parts and especially 60 to 40 parts of a polyester resin containing colophony, abietic acid or their Diels-Alder adducts.

The unsaturated polyester resins thus produced are excellent lacquer resins. They can be ground to granulates or dust-fine powders which can be stored for unlimited periods at room temperature without sticking together. By variation of the said other components it is possible, when using colophony, abietic acid or the said Diels-Adler adducts thereof, to prepare pulverulent, non-sticking unsaturated polyester resins in a wide range of mixtures with special properties which can be used with advantage for a wide variety of purposes. They may be boiled down well with drying or non-drying oils or with alkyd resins. In general they have excellent solubility in many solvents and a good compatibility with other lacquer raw materials. The new products may also be worked up well together with condensation resins, for example from formaldehyde and urea or phenols or on the basis of cumarone as well as with polymers and copolymers, for example polyvinyl esters, polyvinyl halides, polyacrylic esters and polystyrenes. They are also eminently suitable as preliminary binders in the production of plastics reinforced with glass fibres. By reaction with polyisocyanates the chains, which usually consist of linear polyester molecules, can be lengthened. In this case it is favorable to use unsaturated polyesters which have in the main terminal hydroxyl groups.

The unsaturated polyester resins obtained are also eminently suitable for the production of copolymers with ethylenically-unsaturated monomeric polymerizable compounds. It is true that it is known to polymerize mixtures of monomeric ethylenically-unsaturated polymerizable compounds and polymerizable polyester resins, for example from polymerizable alpha.beta-unsaturaed dicarboxylic acids, which may in part be replaced by saturated polycarboxylic acids, and saturated polyalcohols. These mixtures, which if desired contain fillers and glass fibre fabric, can be hardened in molds. The greater the amount of alpha.beta-unsaturated dicarboxylic acid which is contained in the polyester resin, the higher in general is the softening point of the copolymers from these unsaturated polyester resins and polymerizable monomeric compounds. The heat stability of such copolymers is consequently improved. A drawback, however, is that it is difficult to prepare polyester resins with a high content of alpha.beta-unsaturated dicarboxylic acids, because they tend to polymerize during the polycondensation and especially towards the end of the condensation reaction. Moreover, since mixtures thereof with monomeric polymerizable compounds polymerize violently, they are difficult to handle. This is especially so in the production of large shaped articles which therefore readily crack. If on the other hand the polymerizable mixtures contain unsaturated polyester resins with a larger proportion of saturated polycarboxylic acids, the polymerization reaction certainly proceeds less violently, but the copolymers have a worse heat stability.

If the unsaturated polyester resins obtained according to this invention are polymerized with ethylenically-unsaturated polymerizable compounds, the resultant copolymers have a high softening point although the unsaturated polyester resins contain substantial amounts of non-polymerizable polycarboxylic acids. Their heat stability is thus very high.

In admixture with the unsaturated polyester resins containing at least 30 percent of abietic acid there are polymerized monomeric polymerizable ethylenically-unsaturated compounds which have, for example, the general formula:

$$CH_2=C-R_1 \text{ or } CH_2=C-CH_2-R_1$$
$$\phantom{CH_2=C}|\phantom{ or CH_2=C-CH}|$$
$$\phantom{CH_2=}R_2\phantom{ or CH_2=C-CH_2}R_2$$

In these formulae, $R_1$ may be for example an aromatic, iso- or hetero-cyclic radical or a carboxylic, halogen, acyloxy, carbalkoxy or alkoxy radical or an aldehyde, ketone, nitrile, lactam or sulfonic group. $R_2$ may be halogen, alkyl or hydrogen. The radicals $R_1$ and $R_2$ may contain one or more groups having further polymerizable double linkages. Especially suitable vinyl compounds are styrene, its derivatives and homologues, divinylbenzene, N-vinylcarbazole, acrylic acid or methacrylic acid and their derivatives, such as esters, amides or nitriles, for example acrylamide, methacrylamide, methylene-bis-methacrylamide, triacrylol perhydrotriazine or mixures of these compounds, as well as their alpha-halogen derivatives, for example alpha-chloracrylic esters. Vinyl ethers, vinyl esters, as for example vinyl propionate, and N-vinyl lactams, vinyl ketones, vinyl sulfones or other vinyl compounds may also be used. Especially suitable allyl compounds are for example the allyl esters of saturated or unsaturated mono- or poly-carboxylic acids or other organic or inorganic acids, as for example diallyl phthalate, diallyl maleate, succinic acid diallyl esters or triallyl cyanurate, triallyl phosphate, and also allyl ethers of mono- or poly-alcohols as well as the halogen or alkyl derivatives of these compounds, as for example the esters of chlorallyl alcohol or metallyl methallyl alcohol.

The polymerizable monomeric compounds may accordingly be solid or liquid. Since the unsaturated polyester resins used according to this invention can be readily powdered and do not stick together in this form, they may readily be dissolved in liquid monomeric compounds. Obviously mixtures of different monomeric compounds may also be used. The proportion of the monomeric polymerizable compounds in the mixtures of polyester resins and monomers may be varied as desired. The polyester resin mixtures preferably have a monomer content of about 20 to 50 percent.

The mixtures of the unsaturated polyester resins modified with at least 30 percent of colophony or abietic acids, and polymerizable monomeric compounds polymerize substantially less violently than the known mixtures giving polymers with comparably good heat stability. The temperature peak occurring in the polymerization of large batches is lower. The risk of the formation of cracks during the polymerization is thereby considerably reduced. The products obtained have a high heat stability although the unsaturated polyester resins used have a relatively low content of alpha.beta-unsaturated polymerizable carboxylic acids. This low content also has the result that the shrinkage occurring during the hardening is less than in the case of the known temperature-stable polyester resins. The copolymers of these polyester resins with styrene or other monomers have a higher heat stability than copolymers of unsaturated polyester resins which contain, instead of colophony or abietic acid, nonpolymerizable carboxylic acids, as for example phthalic acid.

The mixtures of polyester resins modified with abietic acid, colophony or their reaction products with dienophilic compounds, and polymerizable ethylenically-unsaturated monomeric compounds can be polymerized in the usual way for example by the action of light, especially ultraviolet light or with the aid of peroxides, azo compounds or other radical-forming compounds. As peroxides there may be used for example hydroperoxides, such as tertiary-butyl hydroperoxide, cumene hydroperoxide, tetrahydronaphthalene hydroperoxide, or para-di-iso-propylbenzene dihydroperoxide, and also diacyl peroxides, such as benzoyl peroxide, lauroyl peroxide or diacetyl peroxide, acylated hydroperoxides, as for example tertiary-butyl perbenzoate, peracids, such as perlauric acid or perbenzoic acid, dialkyl peroxides, as for example di-tertiary-butyl peroxide or 2.2'-di-tertiary-butyl peroxybutane, and also ketone peroxides, as for example 1-hydroxy-1'-hydroperoxydicyclohexane peroxide, 1.1'-dihydroperoxycyclohexane peroxide or the corresponding acetone peroxides. A suitable azo compound is for example azo-bis-isobutyronitrile or the corresponding esters. The peroxides can be used in association with activators, for example metal compounds soluble in organic solvents, especially compounds of the metals lead, manganese, cobalt, iron and chromium or also tertiary amines or as constituents of redox systems. As salts of the said metals there are preferably used those of especially high molecular weight monocarboxylic acids, as for example metal salts of alpha-ethylcaproic acid, linseed oil fatty acids, resin acids or naphthenic acids. As examples there may be mentioned cobalt naphthenate or manganese resinate. A suitable tertiary amine is for example dimethylaniline. Complex metal compounds which are soluble in organic solvents, as for example metal acetylacetonates, are also often suitable as driers. In general there are used about 0.1 to 5 percent and especially 0.4 to 4 percent of a peroxide or an azo compound as catalyst. About 3 to 10 percent of a metal drier, with reference to peroxide, is especially favorable.

The polymerizable mixtures may be used for example for the production of shaped articles, coatings, impregnations, bondings and laminates. They may be cast in molds and may be hardened therein if desired while heating, preferably at about 60°–150° C., and under pressure, especially up to 5 to 20 atmospheres. Hardening at room temperature is also possible. In this case it is often preferable to temper the resultant shaped articles at elevated temperature, but this is not essential. Furthermore they are eminently suitable as solvent-free lacquers. Frequently it is especially favorable to polymerize the mixture in the presence of fillers, as for example cork flour, quartz flour, kieselguhr, heavy spar, graphite or antimony trioxide or fabrics of mineral fibres, as for example glass fibre fabrics. Thus for example plates reinforced with glass fibres, carriage parts or boat hulls can be made.

Since the unsaturated polyester resins hitherto used for the production of copolymers with polymerizable monomeric compounds are viscous sticky masses or readily sticking powders or granules, it is impossible to prepare from such masses pulverulent mixtures with solid polymerizable monomeric compounds. Such non-sticky mixtures are of importance for the production of pressed masses. With the aid of pulverulent and non-sticky unsaturated polyester resins containing at least 30 percent of colophony, abietic acid or their reaction products with dienophilic compounds, there may be prepared, by mixing with solid polymerizable monomeric compounds, granulated or pulverized mixtures which do not stick together and are eminently suitable for the production of pressed articles. For this purpose they may be pressed, after the addition of polymerization catalysts, while heating preferably under pressure and if desired in admixture with fillers. The molding powder can be prepared by grinding the unsaturated polyester resin together with the solid polymerizable compounds. By grinding a mixture which has been prepared by melting together the components with the addition of a polymerization inhibitor, a specially homogeneous molding powder is obtained. Good polishing masses may also be prepared therefrom.

The following examples will further illustrate this invention but the invention is not restricted to these examples. The parts specified in the examples are parts by weight.

*Example 1*

A mixture of 440 parts of maleic anhydride, 480 parts of colophony, 332 parts of propylene glycol-1.2 and 162 parts of benzyl alcohol is heated to 160° C. in a stirring vessel while leading nitrogen through for 6 hours and the water formed is continuously distilled off. The temperature is then raised to 190° C. Condensation is continued until the acid number of the reaction product has fallen to 50. At intervals of about 12 hours during the condensation batches, each of 20 parts of propylene glycol-1.2, are added.

The unsaturated polyester resin thus prepared may be comminuted to a granulate which does not coalesce even upon prolonged storage, or may be ground to a powder which is stable in storage.

*Example 2*

A mixture of 510 parts of maleic anhydride, 615 parts of a diene adduct of colophony and acrylic acid, and 505 parts of propylene glycol-1.2 is condensed in a stirring vessel at 180° to 190° C. while leading nitrogen through until the acid number has fallen to 46. The water formed by the condensation is continuously distilled off.

The unsaturated polyester resin obtained can be comminuted to a granulate stable in storage or ground to an extremely fine powder.

Example 3

A mixture of 440 parts of maleic anhydride, 810 parts of a diene adduct of colophony and maleic anhydride, 480 parts of propylene glycol-1.2 and 162 parts of benzyl alcohol is heated at 160° C. in a stirring vessel for 8 hours while leading nitrogen through and the water formed is distilled off during the course of the reaction. The temperature is then slowly raised to 190° C. Condensation is continued until the acid number of the reaction product has fallen to 50. Two or three batches of propylene glycol-1.2, each of 12 parts, are added at intervals of about 12 hours.

The unsaturated polyester resin obtained can be worked up into granulates and powders which are stable in storage.

Example 4

A mixture of 687 parts of maleic anhydride, 332 parts of a diene adduct of colophony and acrylic acid, 207 parts of phthalic anhydride and 713 parts of propylene glycol-1.2 is condensed at 185° C. in a stirring vessel while leading nitrogen through until the resultant polyester resin has the acid number 50. It can be worked up into granulates and powders which are stable in storage.

Example 5

A mixture of 485 parts of maleic anhydride, 570 parts of a diene adduct of colophony and acrylic acid, 65 parts of a diene adduct of colophony and maleic anhydride, 35 parts of colophony, 500 parts of propylene glycol-1.2 and 26 parts of benzyl alcohol is heated at 160° C. in a stirring vessel while leading nitrogen through for 6 hours and the water formed is distilled off. Condensation is then continued at 185° C. until the acid number of the reaction product has fallen to 50. During the condensation two or three batches of propylene glycol-1.2, each of 20 parts, are added at intervals of about 12 hours.

Example 6

60 parts of an unsaturated polyester resin which has been prepared by condensation of a mixture of 31.1 parts of maleic anhydride, 33.9 parts of colophony, 23.5 parts of propylene glycol-1.2 and 11.5 parts of benzyl alcohol, are dissolved in 40 parts of styrene. 100 parts of this solution have added thereto 0.5 part of 1-hydroperoxy-1'-hydroxy-dicyclohexyl peroxide and 0.5 part of a 5 percent solution of cobalt naphthenate in styrene and then poured into molds. After 5 hours, the liquid resin has hardened through to a solid, clear article. After tempering at 110° C. for 12 hours, the completely polymerized resin has a softening point of 125° C.

Example 7

60 parts of an unsaturated polyester resin prepared by condensation of 13.3 parts of maleic anhydride, 64.6 parts of a diene adduct of colophony and acrylic acid and 22.1 parts of propylene glycol-1.2 are dissolved in 40 parts of styrene. To 100 parts of this solution there are added 1.0 part of 1-hydroperoxy-1'-hydroxy-dicyclohexyl peroxide and 1.0 part of a 5 percent solution of cobalt naphthenate in styrene. After 4 hours, the liquid resin has hardened through to a clear, hard mass which after tempering for 12 hours at 100° C. has a heat stability of 102° C.

Example 8

100 parts of a molten resin which has been obtained from 21.7 parts of maleic anhydride, 52.4 parts of a diene adduct of colophony and acrylic acid and 25.9 parts of propylene glycol-1.2, are mixed at 90° C. with 55 parts of styrene which has been stabilized with 0.01 percent of hydroquinone. The whole is allowed to cool and then 0.35 part of 1-hydroperoxy-1'-hydroxy-dicyclohexyl peroxide and 0.15 part of a 5 percent solution of cobalt naphthenate in styrene are added. Within 5 hours, the resin hardens to a clear mass, which has a heat stability of 125° C. after it has been tempered for 24 hours at 110° C.

Example 9

A solution of 60 parts of a polyester resin prepared from 31.3 parts of maleic anhydride, 37.7 parts of a diene adduct of colophony and acrylic acid and 31.0 parts of propylene glycol-1.2, in 40 parts of styrene has 0.5 part of 1-hydroperoxy-1'-hydroxy-dicyclohexyl peroxide and 0.3 part of a 5 percent cobalt naphthenate solution in styrene added thereto. After 4 hours, the liquid mixture has solidified to a hard solid mass which after tempering for 12 hours has a softening point of more then 170° C.

Example 10

0.5 part of benzoyl peroxide is added to a solution of 65 parts of the unsaturated polyester resin used according to Example 9 in 35 parts of styrene. The viscous resin is then brushed onto glass fibre fabric, the treated fabric laminated and pressed for 10 minutes at 100° C. A laminate having good mechanical properties and very good temperature stability is obtained.

Example 11

65 parts of a polyester resin from 23.2 parts of maleic anhydride, 42.8 parts of a diene adduct of colophony and maleic anhydride, 25.4 parts of propylene glycol-1.2 and 8.6 parts of benzyl alcohol are dissolved in 35 parts of styrene. 0.5 part of 1-hydroperoxy-1'-hydroxy-dicyclohexyl peroxide and 0.25 part of a 5 percent solution of cobalt naphthenate in styrene are added to the solution. After 6 hours, the originally viscous liquid resin has hardened through to a solid, clear mass which after tempering for 15 hours at 100° C. softens at 127° C.

Example 12

0.4 part of 1-hydroperoxy-1'-hydroxy-dicyclohexyl peroxide and 0.2 part of a 5 percent solution of cobalt naphthenate in styrene are added to a solution of 65 parts of a polyester resin from 28.8 parts of maleic anhydride, 33.8 parts of a diene adduct of colophony and acrylic anhydride, 3.9 parts of a diene adduct of colophony and maleic anhydride, 2.1 parts of colophony, 29.8 parts of propylene glycol-1.2 and 1.6 parts of benzyl alcohol in 35 parts of styrene. After 4 hours the polyester resin has hardened through to a clear solid mass which has a softening point of 134° C. after it has been tempered for 24 hours at 100° C.

Example 13

70 parts of a dust-fine powder which has been prepared by pulverizing the unsaturated polyester resin used in Example 9 are ground in a ball mill with 30 parts of methacrylamide, 1 part of benzoyl peroxide and 1 part of tertiary-butyl permaleate to form a fine homogeneous powder.

This powder is pressed at 90° C. and the temperature is raised to 125° C. during the pressing. After 10 minutes a clear hard shaped article is obtained which is distinguished by a high temperature stability and which is insoluble and infusible.

Example 14

Alternate layers of a calico fabric web and thin layers of the molding powder used in Example 13 are superposed and the whole pressed as described in Example 13. A laminate is obtained which is very stable to water and organic solvents. Thin laminates prepared in this way are noticeably elastic and flexible.

Example 15

70 parts of the polyester resin used in Example 11, 30 parts of bis-methylene-methacrylamide, 1 part of benzoyl peroxide and 1 part of tertiary-butylpermaleate are ground together to a homogeneous powder.

This powder is pressed at 100° to 150° C. and a hard, solid and clear shaped article is obtained.

*Example 16*

50 parts of the molding powder containing peroxide used in Example 15 are mixed with 50 parts of sawdust and the mixture pressed at 80° to 150° C. A hard and rigid pressed plate having good mechanical properties is obtained.

*Example 17*

70 parts of the unsaturated resin used in Example 9, 15 parts of N-vinylcarbazole, 15 parts of methacrylamide, 1 part of benzoyl peroxide and 1 part of tertiary-butyl permaleate are ground to a homogeneous powder. This is pressed at 80° to 150° C. and hard and clear shaped articles are obtained.

*Example 18*

595 parts of a diene adduct of colophony and acrylic acid, 103 parts of fumaric acid, 38 parts of itaconic acid, 44 parts of phthalic anhydride, 198 parts of propylene glycol-1.2 and 22 parts of ethylene glycol are heated 6 hours at 160° C. in a stirring vessel while leading nitrogen through and the water formed is distilled off continuously. Then 20 parts of propylene glycol-1.2, 2 parts of ethylene glycol and 0.1 part of hydroquinone are added and condensation continued at 180° C. After a further 6 hours, another 20 parts of propylene glycol-1.2 and 2 parts of ethylene glycol are added to the reaction mixture and the condensation is continued at 190° C. until the acid number of the polyester resin formed has fallen to 65.

After cooling the melt, a hard and brittle unsaturated polyester resin is obtained which can be comminuted to non-sticking granulates and powders.

65 parts of this polyester resin are dissolved in 35 parts of styrene, then 1 part of lauroyl peroxide is added and the mixture polymerized at 80° C. A clear and hard polymer is obtained which after tempering for 12 hours at 100° C. has a heat stability of 70° C.

*Example 19*

614 parts of a diene adduct of colophony and acrylic acid, 119 parts of maleic anhydride, 32 parts of succinic acid, 203 parts of propylene glycol-1.2 and 32 parts of butane-diol-1.4 are heated to 160° C. in a stirring vessel while leading nitrogen through and the water formed is distilled off continuously. 20 parts of proylene glycol-1.2, 3 parts of butane-diol-1.4 and 0.2 part of hydroquinone are then added and the condensation temperature raised to 190° C. After a further 6 hours there are again added to the reaction mixture 20 parts of propylene glycol-1.2 and 3 parts of butane-diol-1.4 and the temperature is slowly raised to 230° C. As soon as the acid number of the polyester resin formed has fallen to 70, the condensation is discontinued.

After cooling, a hard and brittle unsaturated polyester resin is obtained which may be comminuted to non-sticking granulates and powders.

60 parts of this polyester resin are dissolved in 40 parts of styrene and then 1 part of benzoyl peroxide, 0.5 part of benzoin and 0.02 part of iron acetylacetonate are added. It is polymerized for 8 hours at 65° C. and a clear and hard polymer is obtained which after tempering for 12 hours at 100° C. has a heat stability of 50° C.

*Example 20*

492 parts of a diene adduct of colophony and acrylic acid, 132 parts of a diene adduct of colophony and maleic anhydride, 113 parts of fumaric acid, 24 parts of maleic anhydride, 32 parts of cyclohexanol, 183 parts of propylene glycol-1.2 and 24 parts of butane-diol-1.3 are heated at 180° C. in a stirring vessel under nitrogen and the water thereby formed is continuously distilled off. After 6 hours 18 parts of propylene glycol-1.2 and 2.4 parts of butane-diol-1.3 are added and condensation is continued at 190° C. After 6 hours a further 18 parts of propylene glycol and 0.2 part of hydroquinone are added and condensation continued at 200° C. until the acid number of the polyester resin formed has fallen to 60.

After cooling, a hard and brittle unsaturated polyester resin is obtained which may be comminuted to non-sticking granulates and powders.

70 parts of this unsaturated polyester resin are dissolved in 30 parts of styrene and then 1 part of benzoyl peroxide is incorporated. This mixture is polymerized for 8 hours at 80° C. and a hard and solid polymer is obtained which after tempering for 12 hours at 100° C. has a heat stability of 70° C.

*Example 21*

65 parts of the unsaturated polyester resin used in Example 9 are dissolved in 35 parts of methyl methacrylate and then 2 parts of methyl ethyl ketone peroxide and 2 parts of a 5 percent solution of cobalt resinate are added. After a few hours, the mass has solidified to a clear polymer. After tempering for 12 hours at 100° C., the polymer has a heat stability of 75° C.

*Example 22*

65 parts of the unsaturated polyester resin used in Example 9 are dissolved in 35 parts of ethyl acrylate and then 2 parts of 1-hydroperoxy-1'-hydroxy-dicyclohexyl peroxide and 2 parts of a 5 percent solution of cobalt octoate in styrene are added. After some hours, the mixture has gelatinized. It is tempered first for 3 hours at 50° C. and then for 10 hours at 100° C. and a polymer is obtained which has a heat stability of 60° C.

*Example 23*

50 parts of the unsaturated polyester resin used in Example 9 are dissolved in 50 parts of diallyl phthalate and 1 part of benzoyl peroxide is added. Polymerization is effected at 80° C. and a clear polymer is obtained.

*Example 24*

65 parts of the unsaturated polyester resin used in Example 12 are dissolved in 35 parts of methyl methacrylate and 0.5 part of benzoyl peroxide is added. Polymerization is effected for 8 hours at 80° C. and the product is then tempered for 12 hours at 100° C. A polymer is obtained which has a heat stability of 50° C.

*Example 25*

65 parts of the unsaturated polyester resin used in Example 12 are dissolved in 35 parts of ethyl acrylate and then 2 parts of 1-hydroperoxy-1'-hydroxy-dicyclohexyl peroxide and 1 part of cobalt octoate are added. After a few hours, the mass has solidified. After tempering for 12 hours at 100° C., the polymer has a heat stability of 70° C.

We claim:

1. In the production of unsaturated polyesters by polycondensation of alpha.beta-ethylenically unsaturated polycarboxylic acids with polyhydric alcohols, the improvement which comprises polycondensing together with said polycarboxylic acids and said polyhydric alcohols between 30% and 85% by weight, with respect to the total weight of initial reactants, of a reaction product consisting of a diene adduct of a compound selected from the group consisting of colophony and abietic acid with an alpha.beta-ethylenically unsaturated monocarboxylic acid at an elevated temperature of about 75° C. to 300° C.

2. An improved process as claimed in claim 1 wherein the polycondensation temperature is between about 140° C. and 250° C.

3. An improved process as claimed in claim 1 wherein polycondensation is carried out until the acid number of the polyester product has fallen below 50.

4. An improved process as claimed in claim 1 wherein the polycarboxylic acid is maleic acid, the polyhydric alcohol is propylene glycol-1.2, and the diene adduct is the reaction product of colophony and acrylic acid.

5. The polyester product obtained by the process of claim 1.

6. The polyester product obtained by the process of claim 3.

7. The polyester product obtained by the process of claim 4.

8. A process for the production of copolymers which comprises copolymerizing an unsaturated polyester resin prepared in accordance with claim 1 together with an ethylenically-unsaturated monomeric polymerizable compound.

9. A process as claimed in claim 8 wherein the copolymerization is carried out at about room temperature to 150° C.

10. A process as claimed in claim 9 wherein the copolymerization is carried out at a pressure up to about 20 atmospheres.

11. A liquid polymerizable mixture of (a) an unsaturated polyester resin prepared according to claim 1 and (b) a liquid ethylenically-unsaturated monomeric polymerizable compound.

12. A pulverulent, non-sticking mixture of (a) an unsaturated polyester resin prepared according to claim 1 and (b) a solid ethylenically-unsaturated monomeric polymerizable compound.

13. A shaped article produced by copolymerization of an unsaturated polyester resin prepared according to claim 1 with an ethylenically-unsaturated monomeric polymerizable compound.

14. A polycondensed unsaturated polyester product obtained by condensing about 15 to 70% by weight of an alpha.beta-ethylenically unsaturated polycarboxylic acid and a dihydric alcohol in approximately stoichiometric proportions together with about 85 to 30% by weight of a diene adduct of abietic acid with a compound selected from the group consisting of acrylic acid, chloracrylic acid and an acrylic acid ester.

15. A polymerized product obtained by copolymerization of the unsaturated polyester product of claim 14 with a monomer selected from the group consisting of vinyl and allyl monomers.

References Cited in the file of this patent

UNITED STATES PATENTS

| 2,033,133 | Ellis | Mar. 10, 1936 |
| 2,156,828 | Wolf | May 2, 1939 |
| 2,063,542 | Ellis | Dec. 8, 1939 |
| 2,343,436 | Wells et al. | Mar. 7, 1944 |
| 2,344,194 | Anderson | Mar. 14, 1944 |
| 2,470,855 | Krumbhaar | May 24, 1949 |
| 2,527,057 | Canfield | Oct. 24, 1950 |
| 2,537,949 | Adams | Jan. 16, 1951 |